(12) United States Patent
Kockisch et al.

(10) Patent No.: US 10,767,743 B2
(45) Date of Patent: Sep. 8, 2020

(54) DIFFERENTIAL GEARING FOR A MOTOR VEHICLE

(71) Applicant: AUDI AG, Ingolstadt (DE)

(72) Inventors: René Kockisch, Limbach-Oberfrohna (DE); Nico Keller, Chemnitz (DE); Udo Pinschmidt, Gaimersheim (DE); Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 32 days.

(21) Appl. No.: 16/081,814

(22) PCT Filed: Feb. 23, 2017

(86) PCT No.: PCT/EP2017/054123
§ 371 (c)(1),
(2) Date: Aug. 31, 2018

(87) PCT Pub. No.: WO2017/148783
PCT Pub. Date: Sep. 8, 2017

(65) Prior Publication Data
US 2019/0072171 A1 Mar. 7, 2019

(30) Foreign Application Priority Data
Mar. 3, 2016 (DE) .......................... 10 2016 203 551

(51) Int. Cl.
*F16H 48/40* (2012.01)
*F16H 48/38* (2012.01)
(Continued)

(52) U.S. Cl.
CPC ............. *F16H 48/40* (2013.01); *F16H 48/38* (2013.01); *B60K 6/52* (2013.01); *B60K 7/0007* (2013.01)

(58) Field of Classification Search
CPC .......... F16H 48/38; F16H 48/40; F16H 48/11; F16H 48/24; F16H 2048/106; F16H 2048/108; B60K 6/52; B60K 7/0007
See application file for complete search history.

(56) References Cited

U.S. PATENT DOCUMENTS

| | | | |
|---|---|---|---|
| 6,971,968 B2 | 12/2005 | Imazu et al. | |
| 2011/0160017 A1* | 6/2011 | Honda | F16H 48/22 475/231 |
| 2016/0003337 A1 | 1/2016 | Smetana | |

FOREIGN PATENT DOCUMENTS

| | | |
|---|---|---|
| DE | 19721091 A1 | 11/1997 |
| DE | 603 02 127 T2 | 5/2006 |

(Continued)

OTHER PUBLICATIONS

Notification of Transmittal of Translation of the International Preliminary Report on Patentability dated Sep. 13, 2018, in connection with corresponding international Application No. PCT/EP2017/054123 (18 pgs., including English translation).

(Continued)

*Primary Examiner* — Huan Le
(74) *Attorney, Agent, or Firm* — Maier & Maier, PLLC

(57) ABSTRACT

A differential gearing for a motor vehicle, with a ring gear, which has an external toothing system and which can be driven by a pinion of the motor vehicle, and with a differential unit which can be driven by the ring gear for rotational speed compensation between wheels of the motor vehicle that can be driven by the pinion via the differential unit, wherein the differential unit has an internal gear which can be driven by the ring gear and has an internal toothing system, the wheels being drivable by way of said internal gear. In relation to a torque flow from the ring gear to the internal gear, a coupling device is arranged between the ring gear and the internal gear.

10 Claims, 1 Drawing Sheet

(51) Int. Cl.
 *B60K 6/52* (2007.10)
 *B60K 7/00* (2006.01)

(56) References Cited

FOREIGN PATENT DOCUMENTS

| DE | 102008015400 A1 | 9/2009 |
| DE | 102008037885 A1 | 3/2010 |
| DE | 102011100816 A1 | 11/2012 |
| DE | 10 2013 202 381 A1 | 8/2014 |
| DE | 10 2013 016 441 A1 | 4/2015 |
| DE | 11 2013 004 889 T5 | 6/2015 |
| DE | 102014118026 A1 | 6/2015 |
| WO | 2005/098278 A2 | 10/2005 |
| WO | 2014/055733 A1 | 4/2014 |

OTHER PUBLICATIONS

International Search Report with English translation and Written Opinion dated May 19, 2017 of corresponding International Application No. PCT/EP2017/054123; 16 pgs.

Search Report dated Nov. 5, 2018 in corresponding German Application No. 10 2016 203 551.7; 16 pages including partial machine-generated English-language translation.

European Office Action dated Nov. 22, 2019, in connection with corresponding EP Application No. 17706987.9 (7 pgs., including machine-generated English translation).

\* cited by examiner

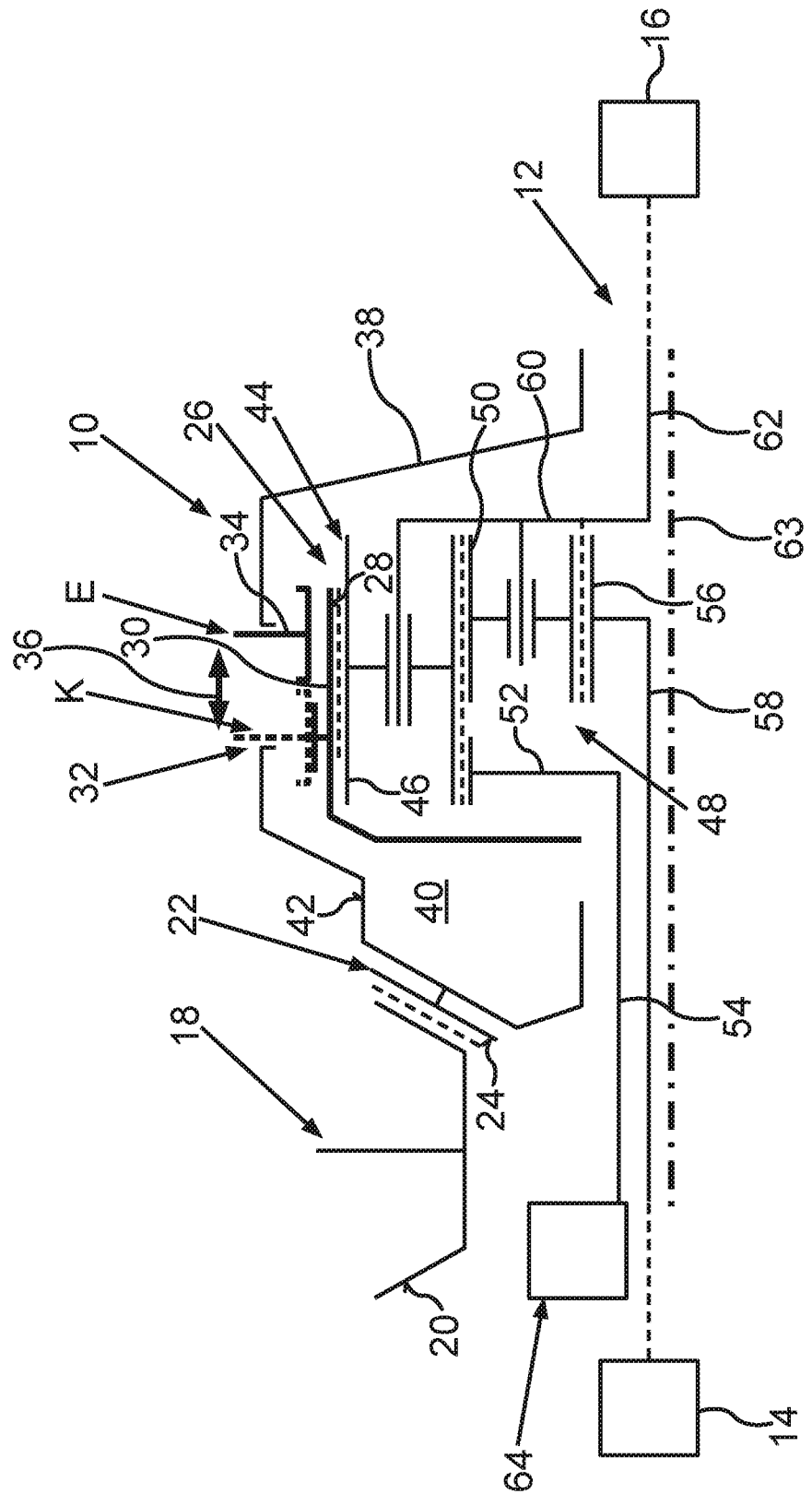

DIFFERENTIAL GEARING FOR A MOTOR VEHICLE

FIELD

The invention relates to a differential gearing, in particular an axle gearing, for a motor vehicle.

BACKGROUND

Such a differential gearing for a motor vehicle, which is designed as an axle gearing, for example, can already be taken as known from DE 10 2008 037 885 A1, for example. The differential gearing comprises a ring gear, which can be driven by a pinion of the motor vehicle. Moreover, the ring gear comprises an external toothing system. Furthermore, the differential gearing comprises a differential unit that can be driven by the ring gear for rotational speed compensation between wheels of the motor vehicles that can be driven by the pinion via the differential unit. In DE 10 2008 037 885 A1, with regard to a torque flow from the ring gear to the differential unit, a friction coupling is arranged between the ring gear and the differential unit, by means of which the ring gear can be coupled to the differential unit or can be decoupled from the differential unit.

Further, DE 10 2014 118 026 A1 discloses a drive module, with a motor and with a gearing and differential assembly. The gearing and differential assembly comprises a differential unit and a gearing upstream from the differential unit, by way of which the differential unit can be driven from the motor.

Furthermore, DE 10 2011 100 816 A1 discloses a drive assembly for wheels of a motor vehicle which can be driven by means of an electric machine and by way of a differential, wherein the electric machine comprising a rotor and a stator drives an input element of the differential, whose output elements drive the wheels of the motor vehicle by way of driven shafts. It is provided here that the annular rotor of the electric machine drives the input element of the differential by way of a translation mechanism and that the translation mechanism and the differential are integrated in the rotor.

In addition, DE 197 21 091 A1 discloses a two-position drive separating device for a differential in a motor vehicle.

SUMMARY

The object of the present invention is to further develop a differential gearing of the kind mentioned above in such a way that an efficient operation of the motor vehicle can be realized in an especially simple and hence economical manner.

The invention relates to a differential gearing for a motor vehicle. In particular, the differential gearing is designed as an axle gearing. The differential gearing comprises a ring gear that has an external toothing system and can be driven by a pinion of the motor vehicle. For example, the motor vehicle comprises a drive motor, by means of which the pinion can be driven. Hence, the ring gear can be driven via the pinion of the drive motor. For example, the ring gear and especially its external toothing system stands in engagement with the pinion.

The differential gearing further comprises a differential unit that can be driven by the ring gear for rotational speed compensation between wheels of the motor vehicle that can be driven by the pinion and thus by the drive motor via the differential unit.

Now, in order to realize an especially efficient and thus low energy-consuming operation of the motor vehicle in an especially simple and thus economical manner, it is proposed according to the invention that the differential unit has an internal gear that can be driven by the ring gear, has an internal toothing system, and via which the wheels can be driven. Moreover, in relation to a torque flow from the ring gear to the internal gear, a coupling device is arranged between the ring gear and the internal gear, and said coupling device can be adjusted or moved between at least one coupled position and at least one decoupled position, especially relative to the internal gear. In the coupled position of the coupling device, the internal gear is coupled to the ring gear by way of the coupling device. In the decoupled position of the coupling device, the internal gear is not coupled to the ring gear via the coupling device, so that, for example, in the decoupled position the internal gear can rotate relative to the ring gear, or so that in the decoupled position no torques can be transmitted from the ring gear via the coupling device to the internal gear, and vice versa.

In the coupled position, torques can be transmitted from the ring gear via the coupling device to the internal gear, so that in the coupled position of the coupling device, the internal gear can be driven by the ring gear via the coupling device, and vice versa. By an internal gear is meant a gear wheel with teeth on the inside, whose internal toothing system meshes or stands in engagement with at least one planetary gear.

Thanks to the use of the internal gear and the coupling device, the packing space requirement and the weight of the differential unit can be kept especially low, and the differential unit can be coupled to and decoupled from the ring gear, and thus the drive motor, in an especially simple and hence economical manner, as needed. For the decoupling of the differential unit and hence the wheels from the ring gear and thus from the drive motor, the coupling device is moved or placed in the decoupled position. In order to couple the differential unit and hence the wheels with the ring gear and thus with the drive motor, the coupling device is moved or placed in its coupled position.

Thanks to the use of the internal gear and the coupling device, it is thus possible in a simple manner, which is favorable in terms of cost, weight, and packing space requirement, to realize an especially wide range of functions of the differential gearing, which is designed, for example, as a transfer case, especially an axle transfer case. Due to the possibility of uncoupling the differential unit and hence the wheels from the ring gear and thus from the drive motor—by placing the coupling device in its decoupled position —different operating modes can be provided, depending on the driving situation. For example, it is possible in simple manner to realize a hybrid drive train or a hybrid driving mode and/or a torque vectoring and/or other operating modes.

Moreover, the uncoupling or decoupling of the internal gear from the ring gear serves for shutting down at least a portion of the drive train of the motor vehicle, so that the motor vehicle can be driven in an especially energy-saving manner. For example, if the drive motor is designed as an internal combustion engine, the fuel consumption and hence the $CO_2$ emission can be kept especially low thanks to the uncoupling.

In order to design the differential gearing in an especially simple and hence economical manner, it is proposed in one advantageous embodiment of the invention that the differential gearing comprises a housing that has an uptake space in which the differential unit is accommodated, wherein the ring gear is arranged on an outer side of the housing facing away from the uptake space.

In order to keep the costs and the packing space requirement especially low, it is proposed in another embodiment of the invention that the internal gear is drivable by the ring gear via the housing, wherein the ring gear is connected to the housing in a rotationally fixed manner and the internal gear is formed separately from the housing, and wherein the internal gear in the coupled position is coupled to the housing via the coupling device and in the decoupled position it is decoupled from the housing.

The ring gear may be formed separately from the housing and connected to the housing. For example, the ring gear is connected to the housing by an integral material connection, especially by welding.

In order to keep the number of parts and thus the costs of the differential gearing especially low, it is proposed in another embodiment of the invention that the ring gear is designed as a single piece with the housing.

In another embodiment of the invention, the internal gear is drivable by the ring gear via the housing, wherein the internal gear is connected to the housing in a rotationally fixed manner and the ring gear is formed separately from the housing, and wherein the ring gear in the coupled position is coupled to the housing via the coupling device and in the decoupled position it is decoupled from the housing. In this way, the complexity and thus the costs of the differential gearing can also be kept especially low.

It may be provided that the internal gear is formed separately from the housing and, in particular, is connected to the housing so that it cannot be detached. For example, the internal gear is connected to the housing by an integral material connection, especially by welding.

However, it has proven to be especially advantageous for the internal gear to be designed as a single piece with the housing, so that the number of parts and thus the costs and the weight of the differential gearing can be kept especially low.

Another embodiment is characterized in that the differential unit is designed as a Ravigneaux set. In this case, the differential unit comprises the internal gear and a first planetary gear set, meshing with the internal gear. The first planetary gear set comprises at least one first planetary gear, which meshes with the internal gear or stands in engagement with the internal gear. The differential unit moreover comprises a second planetary gear set, meshing with the first planetary gear set, which comprises at least one second planetary gear, which stands in engagement with the first planetary gear. The differential unit moreover comprises a first sun gear, meshing with the first planetary gear set, and a second sun gear, meshing with the second planetary gear set. Furthermore, the differential unit comprises a planetary gear carrier, on which the planetary gear sets are mounted or held, especially together.

It has been shown to be especially advantageous in this case for at least a first one of the wheels of the motor vehicle to be drivable by way of the planetary gear carrier, and at least a second one of the wheels to be drivable by way of the second sun gear. In this way, the rotational speed compensation between the wheels can be realized in an especially simple and packing space-favorable manner.

Another embodiment is characterized in that a drive unit is provided, which is different from the drive motor of the motor vehicle, by means of which the first sun gear is drivable, in order to vary or influence a torque distribution on the wheels. Since the first wheel can be driven by way of the planetary gear carrier and the second wheel can be driven by way of the second sun gear, the torque distribution on the wheels can be influenced in an especially simple and cost-effective manner by the first sun gear. For this, the first sun gear is driven accordingly by means of the drive unit. Torque distribution is understood to mean that the wheels are subjected to respective torques by way of the differential unit so as to drive the wheels in this way.

By means of the drive unit, the torque distribution can be performed in an especially advantageous way, as needed, so that interventions in the driving behavior can be realized.

In another embodiment of the invention, in the coupled position of the coupling device, the ring gear is coupled by means of the coupling device in positive locking with the ring gear. In other words, the coupling device is designed to connect the ring gear to the internal gear in its coupled position by positive locking. Stated in yet another way, in its coupled position, the coupling device accomplishes a positive-locking coupling of the ring gear to the internal gear, so that, for example, torques can be transmitted by positive locking from the ring gear to the internal gear via the coupling device. In this way, an especially efficient and hence energy-saving or fuel-saving operation can be realized.

In order to realize an especially low-wear operation, it is proposed in another embodiment of the invention that the differential gearing comprises a synchronizing device for the synchronizing of the ring gear with the internal gear when moving the coupling device from the decoupled position to the coupled position. As is well known for a synchronization of a gearing, the synchronizing device performs a rotational speed equalization or a rotational speed compensation between the internal gear and the ring gear when the coupling device is moved from the decoupled position to the coupled position. If the coupling device is in its decoupled position, relative rotations can occur between the ring gear and the internal gear. If the coupling device is moved from the decoupled position to the coupled position, the synchronizing device brings about an equalizing of the rotational speed of the ring gear to the rotational speed of the internal gear.

In the coupled position, the ring gear and the internal gear are joined together in a rotationally fixed manner and accordingly have the same rotational speed. The use of the synchronizing device makes possible an especially comfortable and low-wear coupling of the ring gear to the internal gear, since the coupling device, for example, is only switched fully, so that the positive-locking coupling of the ring gear to the internal gear can be moved fully into the coupled position, when the rotational speed difference between the internal gear and the ring gear has been sufficiently reduced or eliminated by means of the synchronizing device.

Preferably, the synchronizing device is designed as a friction synchronization, so that the synchronizing device comprises, for example, friction elements, especially friction cones, which come into frictional contact with each other when the coupling device is moved from the decoupled position to the coupled position. As a result of this frictional contact, the ring gear is synchronized with the internal gear, so that any rotational speed difference between the ring gear and the internal gear is lessened or equalized or eliminated.

It has been shown to be especially advantageous to design the synchronizing device as a locking synchronization. In the context of such a locking synchronization, it is provided that the ring gear is coupled to the internal gear in the coupled position by positive locking. Moreover, in the context of the locking synchronization, it is provided that, when the coupling device is moved from the decoupled position to the coupled position, there first occurs a reduction or elimination of any rotational speed difference between the ring gear and the internal gear by friction locking, in that the friction elements of the synchronizing device come into mutual frictional contact—as described.

Preferably, a complete switching of the coupling device is only possible when any rotational speed difference between the ring gear and the internal gear has been at least reduced or eliminated by means of the friction elements, so that the ring gear is coupled to the internal gear via the coupling device in positive locking as a result of the complete switching, and especially only then. Hence, the coupling device can only be moved entirely to the coupled position after the described elimination or reduction of the rotational speed difference between the ring gear and the internal gear. If there is an excessive rotational speed difference between the ring gear and the internal gear, the synchronizing device prevents a complete switching or moving or adjusting of the coupling device from the decoupled position to the coupled position, so that an excessive wear on the differential gearing can be avoided.

It has been shown to be especially advantageous when the differential gearing is designed as a ball differential.

The invention also includes a motor vehicle having at least one differential gearing according to the invention. Benefits and advantageous embodiments of the differential gearing according to the invention should be seen as benefits and advantageous embodiments of the motor vehicle according to the invention, and vice versa.

Further benefits, features and details of the invention will emerge from the following description of a preferred exemplary embodiment as well as with the aid of the drawing. The features and combinations of features mentioned above in the description as well as the features and combinations of features mentioned below in the description of the figures and/or indicated solely in the single FIGURE can be used not only in the particular indicated combination, but also in other combinations or standing alone, without leaving the scope of the invention.

BRIEF DESCRIPTION OF THE DRAWING

FIG. 1 shows a schematic representation of a differential gearing for a motor vehicle, with a ring gear, with a differential unit having an internal gear, and with a coupling device for the coupling and decoupling of the ring gear and the internal gear.

DETAILED DESCRIPTION

FIG. 1 shows in a schematic representation a differential gearing for a motor vehicle, denoted overall by reference 10. The motor vehicle comprises at least two axles, arranged one behind the other in the longitudinal direction of the vehicle, of which only one is shown schematically in the FIGURE and denoted by reference 12. The axle 12 represented schematically in the FIGURE is, for example, a rear axle, so that the other axle not shown in the FIGURE is a front axle. Of course, the above and following remarks can also easily be applied to a front axle of a motor vehicle.

The motor vehicle comprises at least one drive motor, by means of which the motor vehicle can be propelled. The drive motor comprises a driven shaft, by which the drive motor can provide torques for propelling the motor vehicle. By means of these torques, for example, wheels of the other axle not shown in the FIGURE can be driven. It can be seen from the FIGURE that the axle 12 comprises additional wheels 14 and 16, which can also be driven by means of the drive motor—as will be further explained in the following. As will also be explained more closely in the following, the motor vehicle can be operated, for example, in a first operating state, in which the drive motor drives the wheels of the other axle not shown in the FIGURE, but not the wheels 14 and 16. Hence, a two-wheel drive is realized. Moreover, the motor vehicle can be operated in a second operating state in which the drive motor drives both the wheels of the other axle and the wheels 14 and 16 of the axle 12. In this way, a four-wheel drive is realized.

The drive motor and the differential gearing 10 are components of a drive train of the motor vehicle, wherein the drive train comprises a pinion 18 which can be driven by the drive motor, especially by the driven shaft, said pinion comprising an external toothing system 20.

The differential gearing 10 comprises a ring gear 22, having an external toothing system 24. The external toothing system 24 meshes with the external toothing system 20, whereby the ring gear 22 stands in engagement with the pinion 18 by way of the external toothing systems 20 and 24. Thus, the ring gear 22 can be driven by the pinion 18. As will be explained in the following, the wheels 14 and 16 can be driven by way of the ring gear 22 and the pinion 18 by the drive motor, especially by the driven shaft.

The differential gearing 10 comprises a differential unit 26 for rotational speed compensation between the wheels 14 and 16, which can be driven by way of the differential unit 26 and the ring gear 22 by the pinion 18. This means that the wheels 14 and 16 can be driven by the drive motor, especially by the driven shaft, by way of the differential unit 26, the ring gear 22, and the pinion 18. By rotational speed compensation, it is understood that the differential unit 26 enables different rotational speeds between the wheels 14 and 16, for example when the motor vehicle is moving along a curve. For example, if the wheel 14 is the outer wheel of the curve in the case of a right-hand curve, so that the wheel 16 is the inner wheel of the curve, the differential unit 26 makes it possible for the wheels 14 and 16 to rotate with different rotational speeds when moving along this curve. In the mentioned example, the outer wheel 14 of the curve has a first rotational speed and the inner wheel 16 of the curve has a second rotational speed, which is less than the first rotational speed.

Now, in order to realize, in an especially simple and thus economical manner, an especially efficient operation of the drive motor and hence of the motor vehicle overall, the differential unit 26 comprises an internal gear 30 that can be driven by the ring gear 22 and that has an internal toothing system 28, by which the wheels 14 and 16 can be driven. This means that the wheels 14 and 16 can be driven by the drive motor or by the driven shaft, by way of the internal gear 30, the ring gear 22, and the pinion 18.

Moreover, the differential gearing 10 comprises a coupling device, denoted overall by reference 32, which, in relation to a torque flow from the ring gear 22 to the internal gear 30, is arranged between the ring gear 22 and the internal gear 30. The coupling device 32 can be moved between at least one coupled position K, indicated in the FIGURE by broken lines, and at least one decoupled position E, indicated in the FIGURE by solid lines. For this purpose, the coupling device 32 comprises at least one coupling element 34, which can be moved or shifted, especially in translation movement, relative to the internal gear 30, between the coupled position K and the decoupled position E.

In the coupled position K, the internal gear 30 is coupled to the ring gear 22 by way of the coupling device 32, especially by way of the coupling element 34, so that, in the coupled position K, the internal gear 30 and, by way of said gear, the wheels 14 and 16 can be driven by the drive motor by way of the ring gear 22 and the pinion 18. In the decoupled position E, the internal gear 30 is decoupled from the ring gear 22, since in the decoupled position E no torques can be transmitted between the ring gear 22 and the internal gear 30 by way of the coupling device 32. Hence, the differential unit 26 and the wheels 14 and 16 in the decoupled position E are decoupled or uncoupled from the ring gear 22 and hence from the pinion 18 and the drive motor, so that the wheels 14 and 16 cannot be driven by the drive motor. The adjustability or movability of the coupling element 34 relative to the internal gear 30 is illustrated in the FIGURE by a double arrow 36.

Thanks to the use of the coupling device 32 and the internal gear 30, it is possible to keep the packing space requirement of the differential gearing 10 especially small and thereby realize an especially wide array of functions of the differential gearing 10, since the differential gearing 10 can provide the above described rotational speed compensation between the wheels 14 and 16 in an especially advantageous manner, and, in particular, a packing space-saving manner. Moreover, the differential gearing 10 or the differential unit 26 can be coupled to and decoupled from the ring gear 22 and thus coupled to and decoupled from the drive motor as needed and in packing space-saving manner, so that the fuel consumption of the drive motor can be kept especially low.

The differential gearing 10 comprises a housing 38, which has an uptake space 40. The differential unit 26 is accommodated in the uptake space 40. It can be seen from the FIGURE that the ring gear 22 is arranged on an outer side 42 of the housing 38 facing away from the uptake space 40.

The coupling device 32, especially the coupling element 34, is supported, for example, movably on the housing 38, so that the internal gear 30, especially in the coupled position K, can be driven by the pinion 18, by way of the housing 38 and the ring gear 22. In the exemplary embodiment shown in the FIGURE, the ring gear 22 is connected rotationally fixed to the housing 38. It may be provided that the ring gear 22 is designed as a component formed separately from the housing 38 and connected at least rotationally fixed to the housing 38. For example, the ring gear 22 is connected by integral bonding to the housing 38. Moreover, it is provided in the exemplary embodiment illustrated in said FIGURE that the internal gear 30 is formed separately from the housing 38, so that the internal gear 30 in the decoupled position E can rotate relative to the housing 38. In the coupled position K, the internal gear 30 is coupled to the housing 38. In the decoupled position E, however, the internal gear 30 is decoupled from the housing 38. In the exemplary embodiment illustrated in the FIGURE, in both the coupled position K and in the decoupled position E, the ring gear 22 is connected rotationally fixed to the housing 38.

Alternatively, it may be provided that, especially in both the decoupled position E and in the coupled position K, the internal gear 30 is connected at least rotationally fixed to the housing 38, and the ring gear 22 is fashioned separately from the housing 38. In the coupled position K, the ring gear 22 here is coupled to the housing 38, and in the decoupled position E, it is decoupled from the housing 38. Hence, in the decoupled position E, the ring gear 22 can rotate relative to the housing 38, while in both the decoupled position E and in the coupled position K, the internal gear 30 is connected rotationally fixed to the housing 38.

Moreover, it is provided in the exemplary embodiment illustrated in the FIGURE that the differential unit 26 is designed as a Ravigneaux set. The differential unit 26 and hence the Ravigneaux set comprises the internal gear 30 and a first planetary gear set 44, meshing with the internal gear 30, which comprises at least one first planetary gear 46 meshing with the internal gear 30. The differential unit 26 further comprises a second planetary gear set 48, meshing with the first planetary gear set 44, said second planetary gear set 48 comprising at least one second planetary gear 50, meshing with the first planetary gear 46. The differential unit 26 further comprises a first sun gear 52, meshing with the first planetary gear set 44 and thus with the first planetary gear 46, said sun gear 52 being connected rotationally fixed to a first shaft 54.

Moreover, the differential unit 26 comprises a second sun gear 56, meshing with the second planetary gear set 48 and thus with the second planetary gear 50, said second sun gear 56 being connected rotationally fixed to a second shaft 58. Furthermore, the differential unit 26 comprises a planetary gear carrier 60, on which the planetary gear sets 44 and 48 or the planetary gears 46 and 50 are mounted or held in a rotational manner. The planetary gear carrier 56 is connected rotationally fixed to a third shaft 62.

The shafts 58 and 62 and thus the sun gear 56 and the planetary gear carrier 60 can rotate about an axis of rotation 63. It can be seen from the FIGURE that the wheel 16 can be driven by way of the shaft 62 and hence by the pinion 18 by way of the planetary gear carrier 60, so that the third shaft 62 is a first driven shaft of the differential gearing 10. Moreover, the wheel 14 can be driven by way of the second shaft 58 and hence by way of the second sun gear 56, so that the second shaft 58 is a second driven shaft of the differential gearing 10.

Furthermore, the differential gearing 10 comprises a drive unit 64, represented very schematically in the FIGURE and being different from the drive motor for the propelling of the motor vehicle, and the first shaft 54 and hence the first sun gear 52 can be driven by this drive unit. This means that torques can be provided by the drive unit 64, which can be transmitted by way of the first shaft 54 to the first sun gear 52 and can be introduced by way of the first sun gear 52 into the differential unit 26. For this purpose, the drive unit 64 comprises, for example, a motor, different from the drive motor, which is designed, for example, as an electric motor. Moreover, the drive unit 64 may have a gearing by way of which the first shaft 54 or the first sun gear 52 can be driven by the motor of the drive unit 64. The gearing is designed as a planetary gearing, for example, and serves for converting torques provided by the motor of the drive unit 64 into comparatively higher torques. In this way, the packing space requirement and hence the weight of the motor of the drive unit 64 can be kept low.

By means of the drive unit 64, it is possible to influence or vary a torque distribution on the wheels 14 and 16. In other words, it is possible to intervene in the distribution of torques on the wheels 14 and 16 that is produced by means of the differential unit 26, so that, for example, the wheel 14 can be driven by means of a first torque and, at the same time, the wheel 16 can be driven by means of a second torque, which is different from the first torque. In this way, a so-called torque vectoring can be realized, so that, for example, the yaw rate of the motor vehicle can be influenced as needed.

The design of the differential gearing 10 responded to the desire to create a new kind of switching structure that utilizes a given design space in the best possible way. However, subassemblies such as the coupling device 32 configured as the switching or shifting unit can be realized on the basis of already existing solutions, so that overall the packing space requirement and the costs of the differential gearing 10 can be kept especially low. The coupling device 32, for example, is a decoupling structure or a switching or shifting unit, whose actuation, i.e. activation, is produced, for example, by way of an actuator, which can be designed as a mechanical actuator. This actuator is not shown in the FIGURE. It is provided, for example, that the coupling device 32, especially the coupling element 34, can be moved by means of the actuator between the coupled position K and the decoupled position E.

The switching or shifting unit, that is, the coupling device 32 itself, preferably has a positive locking design. This means, for example, that the coupling device 32 is configured to couple the ring gear 22 to the internal gear 30 by way of the coupling device 32 by form fitting in the coupled position K. For this purpose, a toothing system connection may be provided, for example. The coupling element 34, for example, comprises a first gear tooth system and the internal gear 30 a second gear tooth system, the tooth systems being in engagement in the coupled position K. In the decoupled position, however, the gear tooth systems are out of engagement, so that the internal gear 30 is decoupled from the ring gear 22.

It has been shown to be especially advantageous when a synchronizing device designed, for example, as a locking synchronization is provided for the synchronizing of the ring gear 22 with the internal gear 30. In the decoupled position E, for example, different rotational speeds may occur between the ring gear 22 or the housing 38 and the internal gear 30. When the coupling device 32 is moved from the decoupled position E to the coupled position K, this rotational speed difference is reduced and preferably eliminated by means of the synchronizing device, especially by friction locking, for example, when a first friction element that can move along with the coupling element 34 comes into frictional contact with at least one second friction element provided on the internal gear 30. As a result of this frictional contact, the internal gear 30 is brought to the same rotational speed as the ring gear 22, or vice versa, so that the aforementioned rotational speed difference is eliminated. When the rotational speed difference has been lessened or eliminated, the coupling device 32 can be switched fully and brought into the coupled position K, in which the internal gear 30 is coupled by way of the coupling device 32 to the ring gear 22 by positive locking.

In order to keep particularly low the switching times needed for the moving of the coupling device 32 from the decoupled position E to the coupled position K, or vice versa, from the coupled position K to the decoupled position E, preferably a mechanical spring unit is provided, which, for example, assists the movement of the coupling device 32 from the decoupled position E to the coupled position K. For this purpose, the spring mechanism is tensioned in the decoupled position E, for example, and provides a spring force that acts on the coupling device 32, especially on the coupling element 34. By means of the spring force provided by the spring mechanism, the coupling device 32, especially the coupling element 34, can be moved, for example, from the decoupled position E to the coupled position K, or such a movement of the coupling device 32, especially the coupling element 34, from the decoupled position E to the coupled position K is assisted by means of the provided spring force. Alternatively or additionally, it can be provided that a fully automatic movement of the coupling device 32, especially the coupling element 34, for example, from the decoupled position E to the coupled position K, and/or vice versa, can be produced by means of the mechanical spring unit.

The invention claimed is:

1. A differential gearing for a motor vehicle, comprising:
a ring gear, which has an external toothing system and which can be driven by a pinion of the motor vehicle, and with a differential unit which can be driven by the ring gear for rotational speed compensation between wheels of the motor vehicle that can be driven by the pinion via the differential unit, wherein the differential unit has an internal gear, which can be driven by the ring gear and has an internal toothing system, the wheels being drivable by way of said internal gear, wherein, in relation to a torque flow from the ring gear to the internal gear, a coupling device is arranged between the ring gear and the internal gear, and said coupling device can be moved between at least one coupled position, in which the internal gear is coupled to the ring gear, and at least one decoupled position, in which the internal gear is decoupled from the ring gear; wherein the differential unit is designed as a Ravigneaux set and the internal gear comprises a first planetary gear set, meshing with the internal gear; a second planetary gear set, meshing with the first planetary gear set; a first sun gear, meshing with the first planetary gear set; and a second sun gear, meshing with the second planetary gear set; and a planetary gear carrier, on which the planetary gear sets are mounted.

2. The differential gearing as claimed in claim 1, wherein the differential gearing comprises a housing, which has an uptake space in which the differential unit is accommodated, wherein the ring gear is arranged on an outer side of the housing facing away from the uptake space.

3. The differential gearing as claimed in claim 2, wherein the internal gear is drivable by the ring gear by way of the housing, wherein the ring gear is connected rotationally fixed to the housing, and the internal gear is formed separately from the housing, and wherein, in the coupled position, the internal gear is coupled to the housing, and in the decoupled position, it is decoupled from the housing.

4. The differential gearing as claimed in claim 3, wherein the ring gear is designed as a single piece with the housing.

5. The differential gearing as claimed in claim 2, wherein the internal gear is drivable by the ring gear by way of the housing, wherein the internal gear is connected rotationally fixed to the housing, and the ring gear is formed separately from the housing, and wherein, in the coupled position, the ring gear is coupled to the housing, and in the decoupled position, it is decoupled from the housing.

6. The differential gearing as claimed in claim 3, wherein the internal gear is designed as a single piece with the housing.

7. The differential gearing as claimed in claim 1, wherein at least a first one of the wheels is drivable by way of the planetary gear carrier, and at least a second one of the wheels is drivable by way of the second sun gear.

8. The differential gearing as claimed in claim 1, wherein a drive unit is provided, by means of which the first sun gear is drivable, in order to vary a torque distribution on the wheels.

9. The differential gearing as claimed in claim 1, wherein, in the coupled position (K) of the coupling device, the ring gear is coupled by means of said coupling device in positive locking with the internal gear.

10. The differential gearing as claimed in claim 1, wherein a synchronizing device is provided for synchronizing the ring gear with the internal gear when moving the coupling device from the decoupled position to the coupled position.

* * * * *